(12) United States Patent
Kim

(10) Patent No.: US 7,028,796 B2
(45) Date of Patent: Apr. 18, 2006

(54) FOUR-WHEEL DRIVE APPARATUS USING MOTOR, AND METHOD THEREOF

(75) Inventor: Jong Hun Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/747,001

(22) Filed: Dec. 23, 2003

(65) Prior Publication Data

US 2005/0061567 A1 Mar. 24, 2005

(30) Foreign Application Priority Data

Sep. 24, 2003 (KR) ................ 10-2003-0066361

(51) Int. Cl.
*B60K 6/00* (2006.01)
(52) U.S. Cl. ............... 180/65.4; 180/65.2; 180/65.8; 701/22; 701/69
(58) Field of Classification Search ............. 280/233, 280/242, 243; 180/65.2–65.4, 65.8; 701/22, 701/53, 54, 69; 318/139–158; 477/2, 3
See application file for complete search history.

(56) References Cited

U.S. PATENT DOCUMENTS

| | | | |
|---|---|---|---|
| 5,614,809 A * | 3/1997 | Kiuchi et al. ............... 322/11 |
| 5,847,520 A * | 12/1998 | Theurillat et al. .......... 318/139 |
| 6,223,106 B1 * | 4/2001 | Yano et al. ................... 701/22 |
| 6,429,613 B1 * | 8/2002 | Yanase et al. ............... 318/139 |
| 6,549,840 B1 * | 4/2003 | Mikami et al. .............. 701/69 |
| 6,684,970 B1 * | 2/2004 | Gotou ......................... 180/65.2 |
| 6,704,627 B1 * | 3/2004 | Tatara et al. .................. 701/22 |
| 6,741,917 B1 * | 5/2004 | Tomikawa ................... 701/22 |
| 6,757,598 B1 * | 6/2004 | Okoshi ........................ 701/22 |
| 6,766,874 B1 * | 7/2004 | Naito et al. ................ 180/65.3 |

FOREIGN PATENT DOCUMENTS

| | | |
|---|---|---|
| DE | 3542059 | 6/1987 |
| DE | 100 49 567 A1 | 6/2000 |
| DE | 10141923 | 3/2002 |
| EP | 1 327 547 A2 | 10/2003 |
| JP | 07-231508 | 8/1995 |
| JP | 09-224304 | 8/1997 |
| JP | 2000-142155 | 5/2000 |

* cited by examiner

*Primary Examiner*—Lesley D. Morris
*Assistant Examiner*—L. Lum
(74) *Attorney, Agent, or Firm*—Morgan Lewis & Bockius LLP

(57) ABSTRACT

A four-wheel drive apparatus for a vehicle with front wheels driven by an engine comprises a generator connected to the engine for generating an electric current; a motor driven by the electric current supplied from the generator and supplying power for driving rear wheels; a battery charged by the electric current supplied from the generator; a first relay switch for switching electric contact between the generator and the motor; a second relay switch for switching electric contact between the battery and the generator, wherein, the current generated by the generator is alternatively supplied to the motor or the battery.

10 Claims, 3 Drawing Sheets

FOUR-WHEEL DRIVE APPARATUS USING MOTOR, AND METHOD THEREOF

CROSS-REFERENCE TO RELATED APPLICATIONS

This application claims priority of Korean Application No. 10-2003-0066361, filed on Sep. 24, 2003, the disclosure of which is incorporated fully herein by reference.

FIELD OF THE INVENTION

Generally, the present invention relates to a four-wheel drive apparatus and method. More particularly, the present invention relates to a four-wheel drive apparatus and a four-wheel drive method that enable a rear wheel shaft to be driven by an electric motor when a front wheel shaft is driven by an engine

BACKGROUND OF THE INVENTION

Four-wheel drive is a type of drive system in which both front wheels are connected to their own differential and axles, and both rear wheels are connected to their own differential and axles. Between these two differentials, a transfer case is provided so as to transfer driving force.

Four-wheel drive enables a vehicle to travel off-road or on a declined road, and makes it easier to drive in snow such that the safety of the vehicle is improved.

However, because conventional four-wheel drive systems are provided with a transfer case, efficiency of transferring driving force is lower than with two-wheel drive, and the gross weight of the vehicle substantially increases.

SUMMARY OF THE INVENTION

In an exemplary four-wheel drive apparatus for a vehicle, front wheels are driven by an engine, and a generator is connected to the engine for generating an electric current. An electric motor is driven by the electric current supplied from the generator to supply power for driving the rear wheels. A battery is charged by the electric current supplied from the generator. A first relay switch switches the electric contact between the generator and the motor. A second relay switch switches an electric contact between the battery and the generator, wherein the current generated by the generator is alternatively supplied to the motor or the battery.

Preferably, the four-wheel drive apparatus according to one embodiment of the present invention further comprises a controller, wherein when the motor is driven, the controller controls the first switch to be on and the second switch to be off, and when the battery is being charged, the controller controls the first switch to be off and the second switch to be on.

Also preferably, a first voltage detector is provided for detecting output voltage of the battery. A second voltage detector is also provided for detecting output voltage of the generator, wherein the controller controls the rotor current of the generator based on a difference between the voltage of the battery and that of the generator.

Preferably, the generator is controlled in a PWM manner and the duty ratio regarding the rotor current is gradually increased from the initial value set as zero.

Preferably, the four-wheel drive apparatus of the invention also comprises a first speed sensor for detecting an RPM of a front wheel shaft, and a second speed sensor for detecting an RPM of a rear wheel shaft, wherein the controller controls the rotor current based on a difference between the RPM of the front wheel shaft and that of the rear wheel shaft.

A controlling method of a four-wheel drive apparatus for a vehicle according to another embodiment of the invention comprises: determining if a detected output voltage of the battery is higher than a predetermined value; determining if four-wheel drive is required; controlling, when the detected output voltage of the generator is not less than the detected output voltage of the battery, the first relay switch to be on and the second relay switch to be off; generating an electric current utilizing the generator by applying a rotor current computed based on a difference between an RPM of a front wheel shaft and that of a rear wheel shaft; and transferring a driving force from the motor, driven by an electric current supplied from the generator, to the rear wheel shaft.

Preferably, the determining if four-wheel drive is required comprises: detecting RPM of the front wheel shaft and the rear wheel shaft; computing a difference between the RPM of the front wheel shaft and that of the rear wheel shaft; and determining if the computed difference is higher than a predetermined value wherein if the difference between the RPM of the front wheel shaft and that of the rear wheel shaft is higher than the predetermined value, four-wheel drive is determined to be required.

Preferably, if the detected output voltage of the battery is less than a predetermined value, the controlling method further comprises: applying a rotor current to the generator with a duty ratio that gradually increases from zero; determining whether the detected output voltage of the generator is not less than the detected output voltage of the battery; controlling, when the detected output voltage of the generator is not less than the detected output voltage of the battery, the first relay to be off and the second relay to be on; and maintaining the output voltage of the battery at a predetermined voltage rating by feedback control.

DETAILED DESCRIPTION OF THE PREFERRED EMBODIMENTS

A preferred embodiment of this invention will hereinafter be described in detail with reference to the accompanying drawings.

Figure 1:
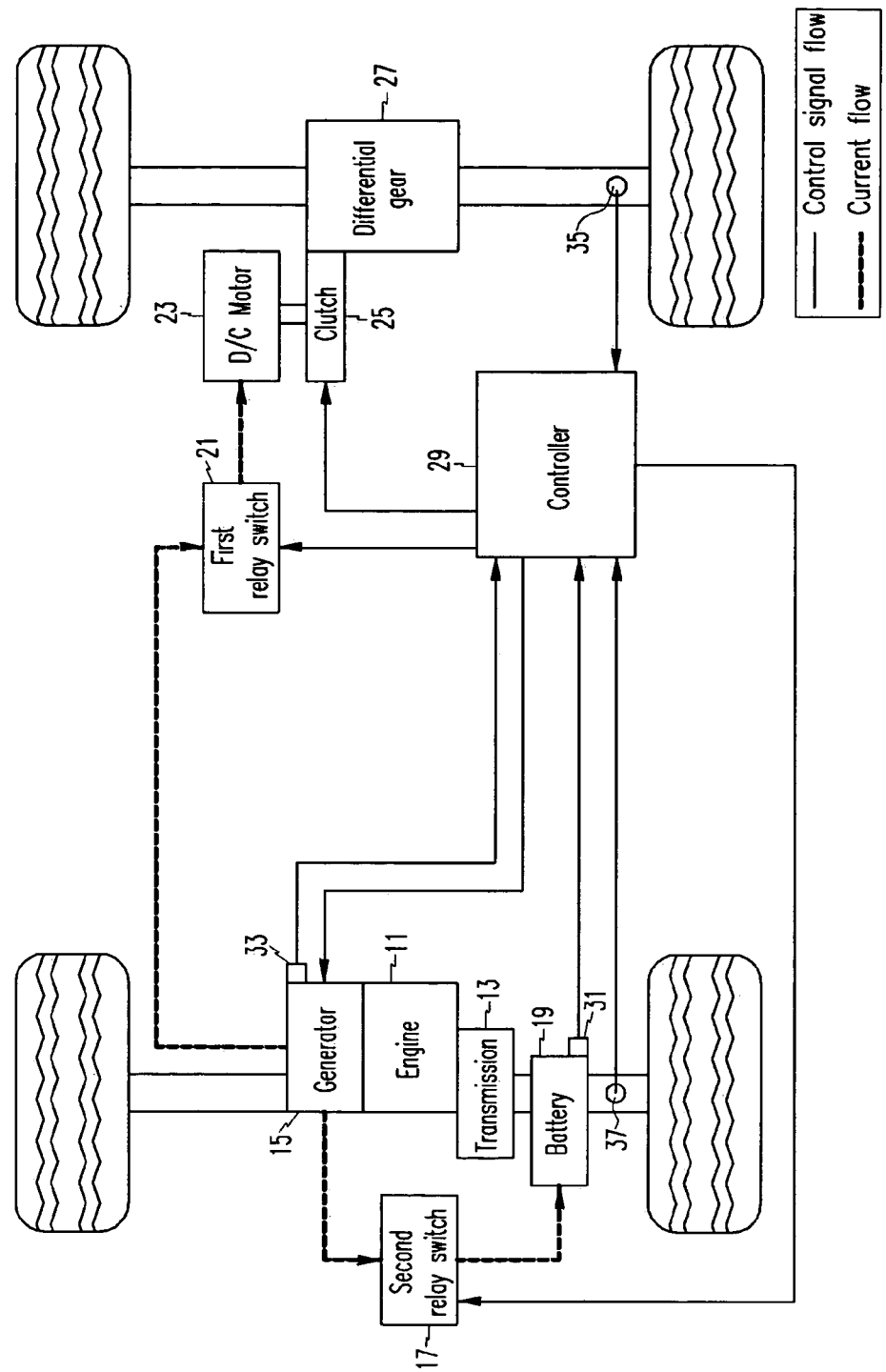
FIG. 1 illustrates a construction of a four-wheel drive apparatus according to an embodiment of this invention.

As shown in FIG. 1, an engine 11 connected to a transmission 13 is also connected to a generator 15 such that an electric current is generated. Preferably, the generator 15 is a DC generator. The generator 15 is connected to a battery 19 and an electric motor 23 such that the generated electric current alternatively charges the battery 19 or drives the motor 23. Preferably, the motor 23 is a DC motor.

A first relay switch 21 switches an electric contact between the generator 15 and the motor 23, and a second relay switch 17 switches electric contact between the generator 15 and the battery 19. When it is required to drive the motor 23, the first relay switch 21 connects the generator 15 and the motor 23 and the second relay switch 17 disconnects the generator 15 and the battery 19 such that the electric current generated by the generator 15 is supplied to the motor 23. Meanwhile, when it is required to charge the battery 19, the first relay switch 21 disconnects the generator 15 and the motor 23 and the second relay switch 17 connects the generator 15 and the battery such that the electric current generated by the generator 15 is used for charging the battery 17.

A first voltage detector 31 for detecting the output voltage of the battery is connected to the battery 19, and a second voltage detector 33 for detecting the output voltage of the generator 15 is connected to the generator. A first speed sensor 37 and a second speed sensor 35 are respectively connected to a front wheel shaft and a rear wheel shaft for detecting RPM. Representative signals of the voltages and the RPMs are transferred to a controller 29.

Figure 2:
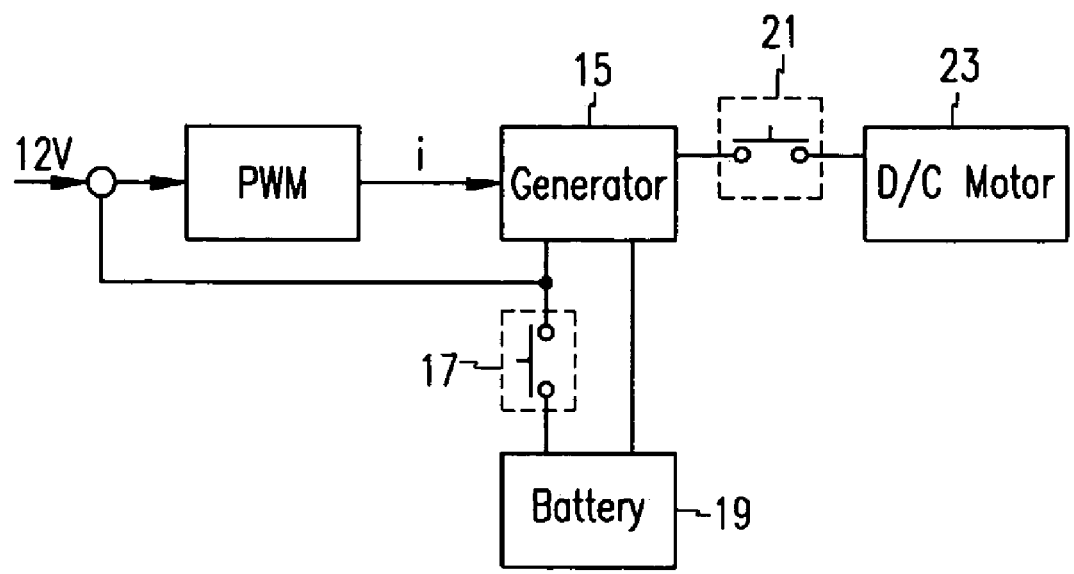
FIG. 2 is a block diagram of a four-wheel drive apparatus according to an embodiment of this invention.
Figure 3:
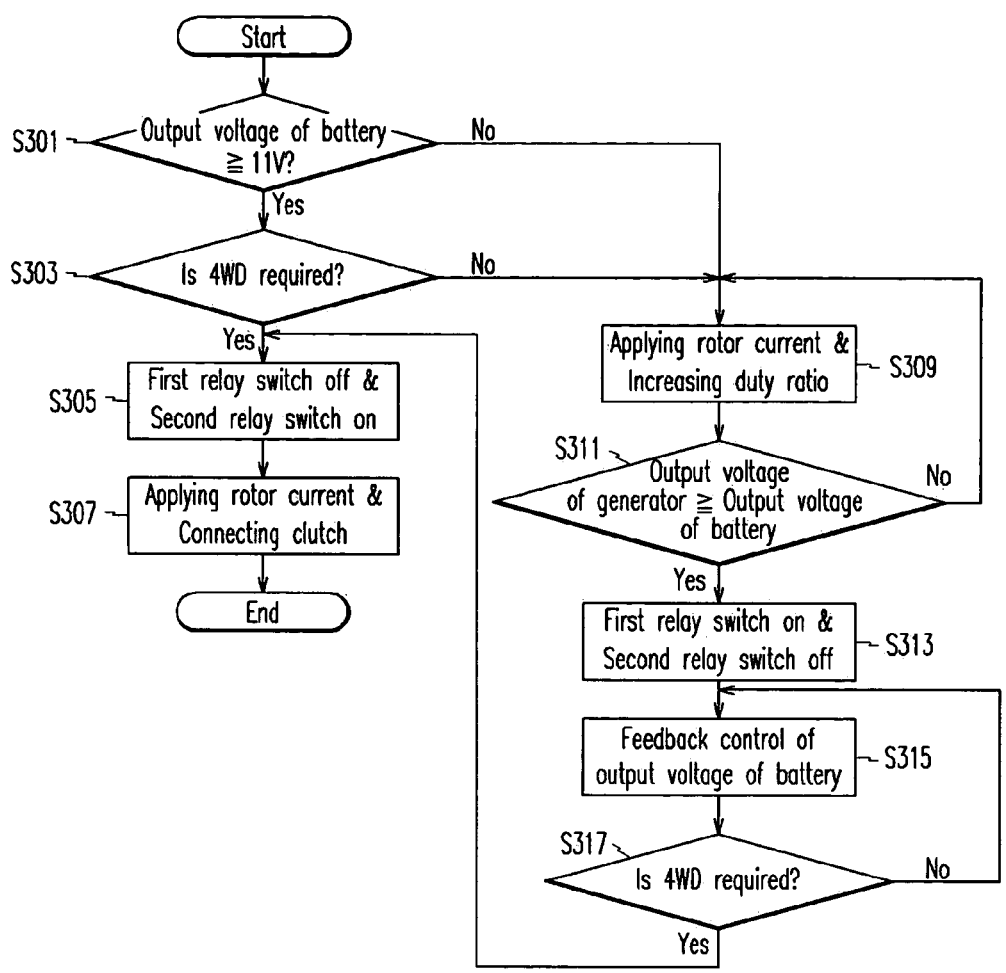
FIG. 3 is a flow diagram of a four-wheel drive method according to an embodiment of this invention.

The controller 29 is a microprocessor operated by a predetermined program and controls the generator 15, the first relay switch 21, the second relay switch 17, and the clutch 25. As shown in FIG. 2, when the controller 29 generates a pulse width modulation (PWM) signal for a rotor current, the generated current from the generator 15 is alternatively used for driving the motor 23 or for charging the battery 19 according the switching operations of the first and second relay switches 21, 17.

When the battery 19 is being charged, the controller 29 generates a signal for the rotor current based on the output voltage of the battery detected by the first voltage detector 31 and the output voltage of the generator detected by the second voltage detector 37. When the motor 23 is being driven, the controller 29 generates a signal for the rotor current based on the RPM of the front wheel shaft and that of the rear wheel shaft.

The output voltage of the battery 19 detected by the first voltage detector 31 is transferred to the controller 29. The controller 29 determines if the output voltage of the battery is not less than a first predetermined voltage at step S301.

The first predetermined voltage is a minimum of voltage required for driving electric equipment which is provided to the vehicle. Preferably, when the voltage rating of the battery is 12V, the first predetermined voltage is set as 11V.

When the output voltage of the battery is not less than the first predetermined voltage, controller 29 determines if four-wheel drive is required at step S303.

The controller 29 determines if four-wheel drive is required based on the RPM of the front wheel detected by the first speed sensor 37 and that of the rear wheel detected by the second speed sensor 35. When the difference between the RPM of the front wheel and that of the rear wheel is higher than a predetermined value, it is determined that four-wheel drive is required.

When four-wheel drive is required, the controller 29 controls the first relay switch to be on and the second relay switch to be off at step S305. Accordingly, the motor 23 is electrically connected to the generator 15 such that electric power from the generator 19 is supplied to the motor 23 at step 305.

Sequentially, a rotor current, which is computed based on the difference between the RPM of the front wheel shaft and that of the rear wheel shaft, is applied to the generator 15, and driving force from the motor 23, which is driven by the electric current from the generator 15, is transferred to and drives the rear wheel shaft through a clutch 25 and a differential gear 27 at step 307.

Preferably, the controller 29 generating the rotor current controls the generator 15 in a PWM manner.

When the output voltage of the battery is less than the first predetermined voltage or when four-wheel drive is not required, the controller 29 applies a rotor current for generating an electric current in order to charge the battery 19 at step S309. At step S309, the controller 29 controls the generator 15 in a PWM manner, and an initial value of a duty ratio of the rotor current is set as zero.

The controller 29 determines if the output voltage of the generator detected by the second voltage detector 33 is not less than the output voltage of the battery detected by the first voltage detector 31 at step S311. If the output voltage of the generator is less than the output voltage of the battery, the duty ratio of the rotor current is increased at step S309. The steps S309 and S311 are repeatedly executed until the output voltage of the generator is not less than the output voltage of the battery. Therefore, the duty ratio of the rotor current of the generator is gradually increased such that an electric shock between the generator 15 and the battery 19 is prevented.

When the output voltage of the generator is not less than the output voltage of the battery, the controller 29 controls the first relay switch 21 to be off, and the second relay switch 17 to be on, such that the battery 19 is charged by the current generated by the generator 15 at step S313. Subsequently, the controller 29 maintains the output voltage of the battery to be at a second predetermined voltage by feedback control at step S315.

When charging of the battery is completed, the controller 29 again determines if four-wheel drive is required at step S317. The step S317 is executed in the same manner as the step S303.

According to a four-wheel drive apparatus and method according to an embodiment of the invention as described above, one generator alternatively supplies an electric current to the battery for charging or to the motor for driving such that an efficient four-wheel drive system can be realized.

Furthermore, the output voltage of the generator is directly controlled and is applied to the battery such that a DC/DC converter is not required, and the construction of the four-wheel drive system becomes simple.

What is claimed is:

1. A four-wheel drive apparatus for a vehicle in which a first set of wheels are driven by an engine, comprising:
   a generator connected to the engine for generating an electric current;
   a motor driven by the electric current supplied from the generator and supplying power for driving a second set of wheels;
   a battery charged by the electric current supplied from the generator;
   a first relay switch for switching an electric contact between the generator and the motor; and
   a second relay switch for switching an electric contact between the battery and the generator,
   a first voltage detector for detecting output voltage of the battery; and
   a second voltage detector for detecting output voltage of the generator,
   wherein the current generated by the generator is alternatively supplied to the motor or the battery, further comprising a controller that controls the first switch to be on and the second switch to be off when the motor is driven, and controls the first switch to be off and the second switch to be on when the battery is charging and,
   wherein the controller controls a rotor current of the generator based on a difference between the voltage of the battery and that of the generator.

2. The apparatus of claim 1, wherein the generator is controlled in a PWM manner.

3. The apparatus of claim 1, wherein a duty ratio regarding the rotor current is gradually increased from an initial value set as zero.

4. A four-wheel drive apparatus for a vehicle in which a first set of wheels are driven by an engine, comprising:
   a generator connected to the engine for generating an electric current;
   a motor driven by the electric current supplied from the generator and supplying power for driving a second set of wheels;
   a battery charged by the electric current supplied from the generator;
   a first relay switch for switching an electric contact between the generator and the motor; and
   a second relay switch for switching an electric contact between the battery and the generator,
   a first speed sensor for detecting an RPM of a wheel shaft for the first set of wheels;
   a second speed sensor for detecting an RPM of a wheel shaft for the second set of wheels;
wherein the current generated by the generator is alternatively supplied to the motor or the battery, further comprising a controller that controls the first switch to be on and the second switch to be off when the motor is driven, and controls the first switch to be off and the second switch to be on when the batten is charging and,
   wherein the controller controls a rotor current based on a difference between the RPM of the first set wheel shaft and that of the second set wheel shaft.

5. The apparatus of claim 4, wherein the generator is controlled in a PWM manner.

6. A controlling method of a four-wheel drive apparatus for a vehicle in which a first set of wheels is driven by an engine, wherein the apparatus comprises a generator connected to the engine for generating an electric current, a motor driven by the electric current supplied from the generator and supplying power for driving a second set of wheels, a battery charged by the electric current supplied from the generator, a first relay switch for switching an electric contact between the generator and the motor, and a second relay switch for switching an electric contact between the battery and the generator, comprising:
   determining if a detected output voltage of the battery is not less than a first predetermined voltage;
   determining if four-wheel drive is required;
   controlling, when the detected output voltage of the battery is not less than a first predetermined voltage and four-wheel drive is required, the first relay switch to be on and the second relay switch to be off;
   generating an electric current utilizing the generator by applying a rotor current computed based on a difference between an RPM of a wheel shaft of the first set of wheels and that of a wheel shaft of the second set of wheels; and
   transferring driving force from the motor, driven by an electric current supplied from the generator, to the second set wheel shaft.

7. A controlling method of claim 6, wherein the determining if four-wheel drive is required comprises:
   detecting RPM of the first set wheel shaft and the second set wheel shaft;
   computing a difference between the RPM of the first set wheel shaft and that of the second set wheel shaft; and
   determining if the computed difference between the RPM of the first set wheel shaft and that of the second set wheel shaft is higher than a predetermined value,
   wherein if the difference between the RPM of the first set wheel shaft and that of the second set wheel shaft is higher than the predetermined value, four-wheel drive is determined to be required.

8. A controlling method of claim 6, wherein if the detected output voltage of the battery is less than a predetermined value, the controlling method further comprises:
   applying a rotor current, with a duty ratio gradually increasing from zero, to the generator;
   determining whether the detected output voltage of the generator is not less than the detected output voltage of the battery;
   controlling, when the detected output voltage of the generator is not less than the detected output voltage of the battery, the first relay to be off and the second relay to be on; and
   maintaining the output voltage of the battery at a second predetermined voltage by feedback control.

9. The apparatus of claim 6, wherein the first set of wheels is front wheels and the second set of wheels is rear wheels.

10. The apparatus of claim 6, wherein the first set of wheels is rear wheels and the second set of wheels is front wheels.

* * * * *